(12) United States Patent
Dewey et al.

(10) Patent No.: US 7,823,924 B2
(45) Date of Patent: Nov. 2, 2010

(54) SEATBELT PRETENSIONER FOR A VEHICLE

(75) Inventors: Kevin J. Dewey, Shelby Township, MI (US); Jeff A. Russell, Warren, MI (US)

(73) Assignee: Autoliv ASP, Inc., Ogden, UT (US)

( * ) Notice: Subject to any disclaimer, the term of this patent is extended or adjusted under 35 U.S.C. 154(b) by 205 days.

(21) Appl. No.: 12/145,045

(22) Filed: Jun. 24, 2008

(65) Prior Publication Data

US 2009/0315312 A1 Dec. 24, 2009

(51) Int. Cl.
*B60R 22/36* (2006.01)
*B60R 22/46* (2006.01)

(52) U.S. Cl. .................. 280/806; 297/476; 297/479; 297/480

(58) Field of Classification Search .................. 280/806; 297/468, 476, 479, 480
See application file for complete search history.

(56) References Cited

U.S. PATENT DOCUMENTS

| | | | | | |
|---|---|---|---|---|---|
| 5,294,150 | A | * | 3/1994 | Steffens, Jr. | 280/801.2 |
| 5,374,110 | A | * | 12/1994 | Hiramatsu | 297/480 |
| 5,671,949 | A | | 9/1997 | Bauer et al. | |
| 6,155,512 | A | | 12/2000 | Specht et al. | |
| 6,419,271 | B1 | * | 7/2002 | Yamada et al. | 280/806 |
| 6,450,435 | B2 | | 9/2002 | Junker et al. | |
| 6,454,306 | B1 | | 9/2002 | Cunningham et al. | |
| 6,527,299 | B2 | * | 3/2003 | Specht et al. | 280/806 |
| 6,561,936 | B1 | * | 5/2003 | Betz et al. | 474/110 |
| 6,626,463 | B1 | * | 9/2003 | Arima et al. | 280/806 |
| 6,712,394 | B2 | * | 3/2004 | Betz et al. | 280/805 |
| 6,820,310 | B2 | * | 11/2004 | Woodard et al. | 24/171 |
| 6,902,195 | B2 | | 6/2005 | Ball et al. | |
| 7,118,132 | B2 | * | 10/2006 | Terasaki | 280/806 |
| 7,118,133 | B2 | | 10/2006 | Bell et al. | |
| 7,172,218 | B2 | * | 2/2007 | Nakano et al. | 280/806 |
| 7,338,083 | B2 | * | 3/2008 | Sakata | 280/806 |
| 7,533,902 | B2 | * | 5/2009 | Arnold et al. | 280/806 |
| 7,631,900 | B2 | * | 12/2009 | Nakayama et al. | 280/806 |
| 2002/0030396 | A1 | * | 3/2002 | Stevens | 297/480 |
| 2006/0087108 | A1 | * | 4/2006 | Midorikawa | 280/806 |
| 2006/0279077 | A1 | * | 12/2006 | Nakano et al. | 280/806 |
| 2007/0013186 | A1 | | 1/2007 | Bell | |
| 2007/0029774 | A1 | | 2/2007 | Kuroki | |

* cited by examiner

*Primary Examiner*—Paul N Dickson
*Assistant Examiner*—Nicole Verley
(74) *Attorney, Agent, or Firm*—Sally J Brown; Brinks Hofer Gilson & Lione

(57) ABSTRACT

In at least one embodiment of the present invention, a seatbelt pretensioner is provided. The pretensioner comprises a cylinder having a proximal section which defines a gas chamber that forms at least a portion of an interior space defined by the cylinder. Extending distally from the proximal section is a guide section. Disposed within the interior space is a piston that is moveable toward a distal end of the guide section. The piston has a proximal portion and a distal portion that extends from the proximal portion. The proximal and distal portions are disposed respectively adjacent to the proximal and guide sections. The distal portion is configured for attaching to an anchor that is coupled to webbing of the seatbelt. In fluid communication with the gas chamber is a gas generator. The gas generator is configured for generating gas to move the piston, tensioning the seatbelt.

17 Claims, 4 Drawing Sheets

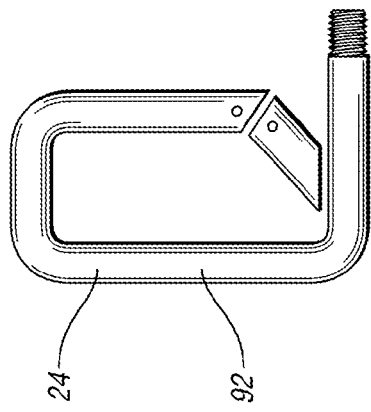
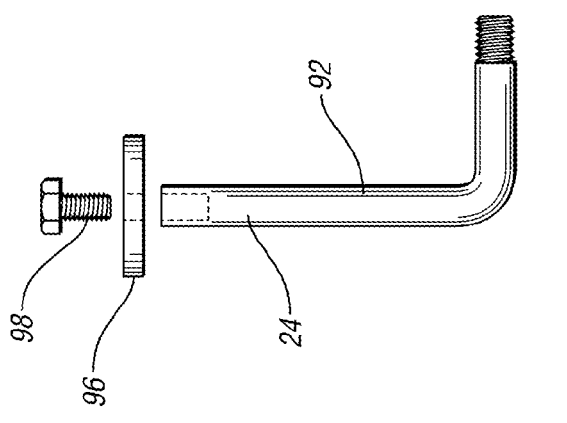
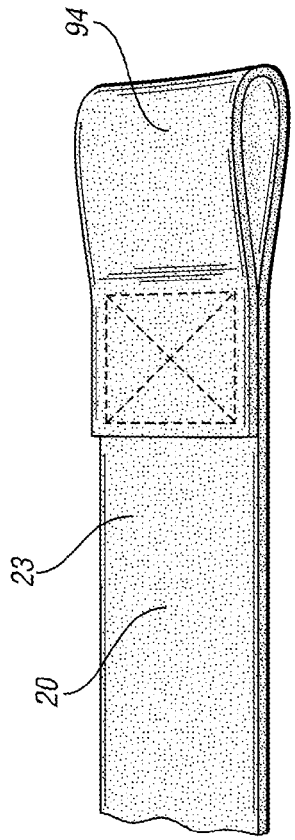
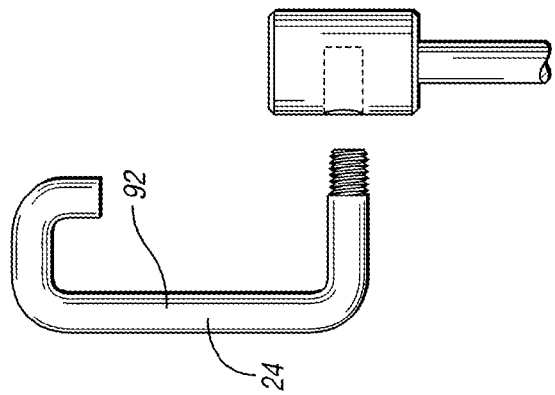

SEATBELT PRETENSIONER FOR A VEHICLE

BACKGROUND OF THE INVENTION

1. Field of the Invention

The present invention relates generally to seatbelt restraint systems for vehicles and, more particularly, to a seatbelt pretensioner for a seatbelt restraint system in a vehicle.

2. Background

Seatbelt restraint systems for restraining an occupant in a vehicle seat play an important role in vehicle crash situations. Seat restraint systems commonly have a lap belt section and a shoulder belt section. In general, the lap belt section and the shoulder belt section are connected together at one end. A seat restraint system includes a buckle at the connected end. The seat restraint system also includes a latch plate connected at one end by webbing that is attached to the vehicle structure and/or the seat. The buckle receives the latch plate to be buckled together. When the buckle and the latch plate are buckled together, the seat restraint system restrains movement of the occupant during a collision.

OEM vehicle manufacturers often incorporate pretensioning devices, which tension the seatbelt prior to full impact of a vehicle, to enhance restraining the occupant to the seat. One type of pretensioning device is a pyrotechnic lap pretensioner (PLP). Various designs are known, including a type of PLP which uses a cable to connect a piston at one end to seatbelt webbing at the other end. When a collision occurs, a pyrotechnic charge is fired, producing gas which pressurizes a gas chamber within a tube, to force the piston down the tube. Since the seatbelt webbing is ultimately connected to the piston via the cable, the seatbelt moves in conjunction with the piston, tightening the belt around the occupant.

This design, however, has several shortcomings. One problem is that the cable is connected to the piston at a portion of the piston that is closest to the pyrotechnic charge or gas generator. The corresponding portion of the tube where this connection occurs is within the gas chamber and accordingly, the cable runs through the gas chamber. An aperture, which opens into the gas chamber, is formed by the tube for the cable. This makes it difficult to seal the gas chamber so consequently, some of the gas and therefore energy produced by the charge is lost through the aperture.

Another problem with current designs of PLP's is that OEM's and many end users consider the cable connection between the seatbelt webbing and the PLP visually objectionable. Accordingly, often times a cover piece is placed over and connected directly to the cable. The cover piece is typically a styled, grained and molded-in-color plastic trim part. When a charge is fired, the cable moves which correspondingly moves the cover piece. However, the cover piece can sometimes interfere with tensioning of a seatbelt, because the cover piece may interact with a stationary, decorative trim disposed about the seat.

Moreover, the cover piece serves merely an aesthetic function and provides minimal to no pretensioning function. Accordingly, an alternative design which eliminates the cable, the cover piece and preferably does not diminish the visual appearance of the PLP-webbing connection is desirable.

SUMMARY OF THE INVENTION

In at least one embodiment of the present invention, a seatbelt pretensioner for tensioning a seatbelt of a vehicle is provided. The pretensioner comprises a cylinder having a proximal section which defines a gas chamber that forms at least a portion of an interior space defined by the cylinder. Extending distally from the proximal section is a guide section. Disposed within the interior space is a piston that is moveable toward a distal end of the guide section. The piston has a proximal portion and a distal portion that extends from the proximal portion. The proximal and distal portions are disposed respectively adjacent to the proximal and guide sections. The distal portion is configured for attaching to an anchor that is coupled to webbing of the seatbelt. In fluid communication with the gas chamber is a gas generator. The gas generator is configured for generating gas to move the piston, tensioning the seatbelt.

In at least one other embodiment of the present invention a seatbelt pretensioner system for a vehicle is provided. The system comprises a seatbelt including webbing. The seatbelt is configured for restraining an occupant of the vehicle to the seat. An anchor is coupled to the webbing. The seatbelt pretensioner as discussed in the foregoing paragraph has the distal portion of the piston attached to the anchor.

Further objects, features, and advantages of the invention will become apparent from consideration of the following description and the appended claims when taken in connection with the accompanied drawings.

BRIEF DESCRIPTION OF THE DRAWINGS

FIG. 5a is an exploded plan view of a portion of a seatbelt pretensioner in accordance with another embodiment of the present invention;

FIG. 5b is an exploded plan view of an anchor in accordance with another embodiment of the present invention;

FIG. 5c is a plan view of an anchor in accordance with yet another embodiment of the present invention;

FIG. 5d is a perspective view of an end portion of seatbelt webbing in accordance with an embodiment of the present invention;

DETAILED DESCRIPTION OF THE INVENTION

Figure 1:
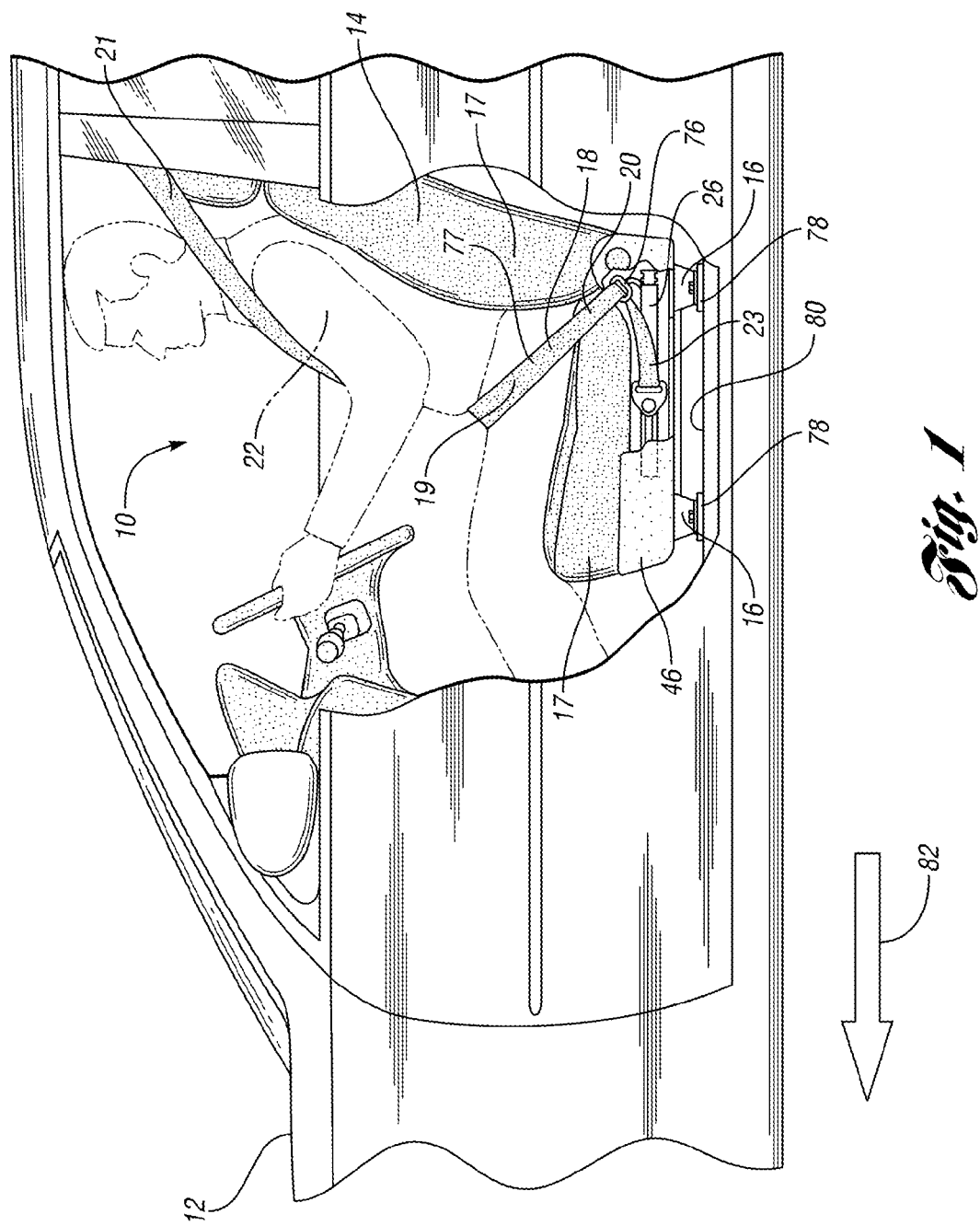
FIG. 1 is a side view of a seatbelt pretensioner system for a vehicle in accordance with an embodiment of the present invention.

Detailed embodiments of the present invention are discussed herein. It is understood however, that the disclosed embodiments are merely exemplary of the invention and may be embodied in various and alternative forms. The figures are not necessarily to scale; some figures may be configured to show the details of a particular component. Therefore, specific structural and functional details disclosed herein are not interpreted as limiting but merely as a representative basis with the claims and for teaching one skilled in the art to practice the present invention.

Examples of the present invention seek to overcome some of the concerns associated with pyrotechnic lap pretensioners (PLP's) for seatbelt systems used in vehicles. These concerns include improved sealing of the pretensioner's gas chamber, minimizing potential interference between the seatbelt tensioning and the decorative trim of the seat, and decreasing part complexity and associated costs while maintaining and/or improving aesthetic appearance of the pretensioner system.

Referring now to FIGS. 1-4, at least one embodiment of a seatbelt pretensioner system is provided. The seatbelt pretensioner system 10 is for a vehicle 12. The vehicle 12 comprises a seat 14 that includes a seat frame 16. The seat frame 16 provides structural support for the seat 14 and is preferably made of rigid material, such as for example, metal, composites or any other suitable material known to those skilled in the art. The seat 14 may also have a covering 17 which is commonly disposed about at least a significant portion of the seat frame 16. The covering 17 is typically visible to an occupant 22 and accordingly, has specific appearance requirements.

In one embodiment, the system 10 comprises a seatbelt 18. The seatbelt 18 is configured for restraining the occupant 22 to the seat 14, for example, during a collision or other dynamic condition of the vehicle 12. The seatbelt 18 may be part of a three-point safety restraint system including a lap belt section 19 and a shoulder belt section 21. The seatbelt 18 is formed of webbing 20 made from a flexible material that is extremely strong and tear resistant. Preferably the webbing 20 is made from fabric, such as for example, a polyester fabric, e.g. DACRON™. Moreover, because the webbing 20 is visible to the occupant 22 of the vehicle 12 its appearance is important and accordingly, the webbing 20 may be crafted and colored to compliment the interior of the vehicle 12. Other suitable materials known to those skilled in the art may be used for the webbing 20.

Figure 3:
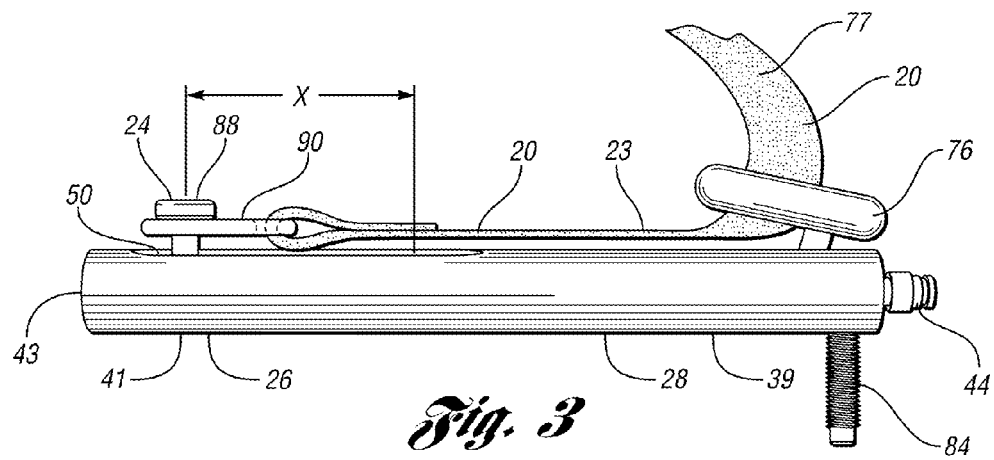
FIG. 3 is a side view of a seatbelt pretensioner in an undeployed state in accordance with an embodiment of the present invention.
Figure 4:
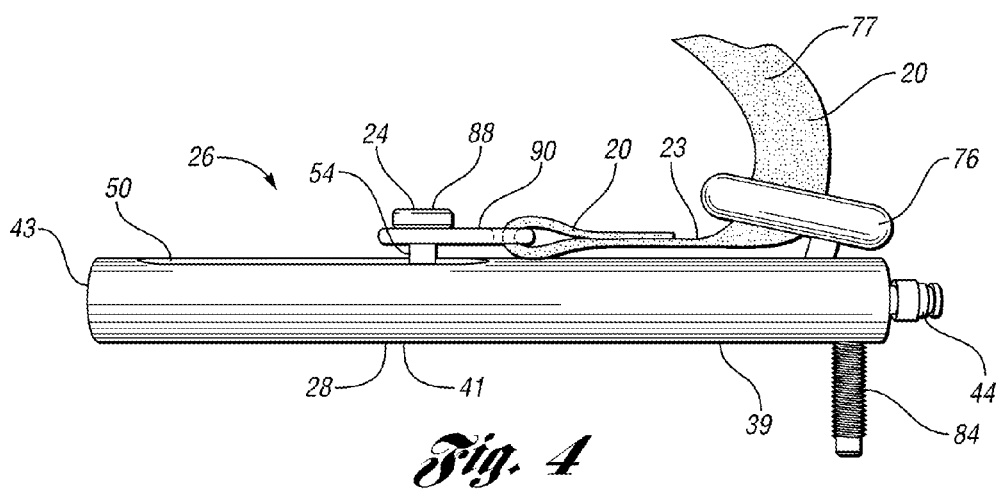
FIG. 4 is a side view of a seatbelt pretensioner in a deployed state in accordance with an embodiment of the present invention.
Figure 6A:
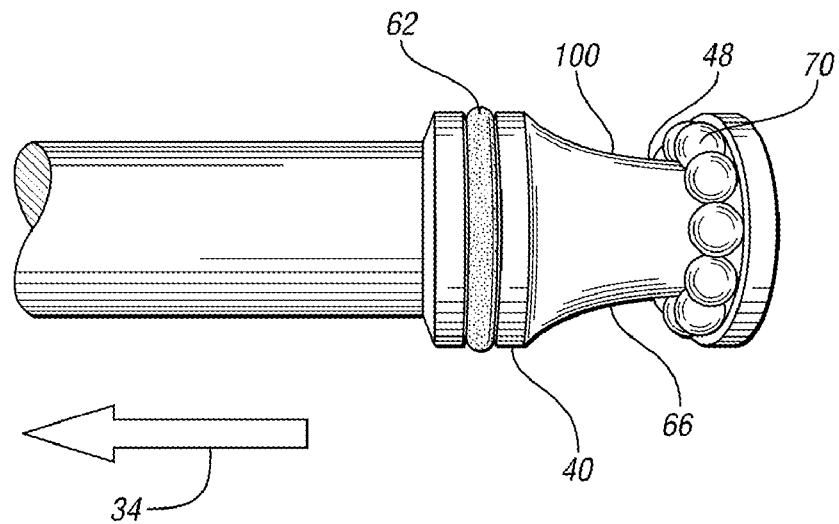
FIG. 6a is a perspective view of a portion of a seatbelt pretensioner with an unengaged clutch in accordance with an embodiment of the present invention.
Figure 6B:
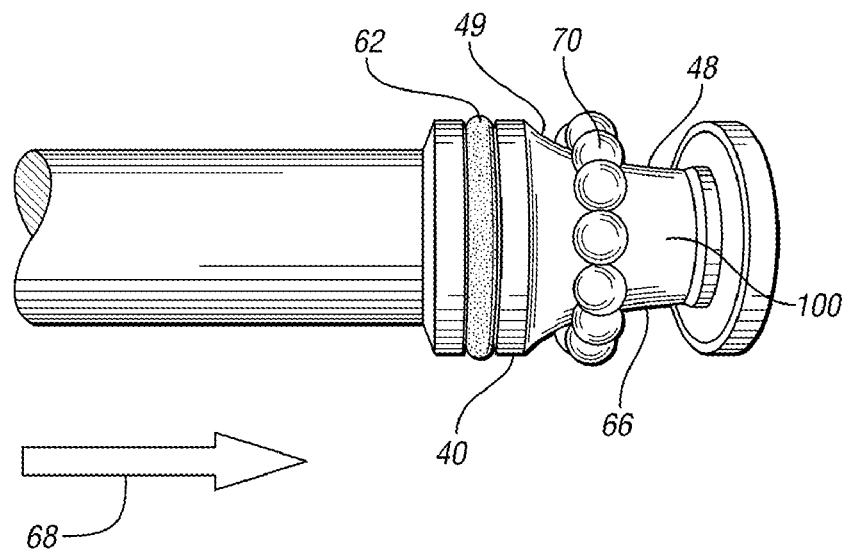
FIG. 6b is a perspective view of a portion of a seatbelt pretensioner with an engaged clutch in accordance with at least one embodiment of the present invention.

An anchor 24 is coupled to the webbing 20. The anchor 24 may be made of metal, such as for example, low carbon steel or any other suitable rigid material for structurally securing the webbing 20. The anchor 24 may also be visible to the occupant 22 and may be crafted accordingly. For example and as illustrated in FIGS. 3 and 4, the anchor 24 may include a head 88 and a receiving loop 90 for receiving and coupling to the webbing 20. The head 88 and the receiving loop 90 may be coated and/or grained for appearance.

Referring to FIGS. 1-5d, the anchor 88 may alternatively have a catch 92, which is received by a closed loop 94 formed at an end of the webbing 20. The catch 92 may be formed as an open hook configuration, illustrated in FIGS. 5a and 5b, or as closed hook configuration, illustrated in FIG. 5c. The catch 92 may also included a washer or retainer 96 that is fastened to the anchor 88 by a retaining bolt 98. The retainer 92 helps to retain the closed loop 94 of the webbing 20 about the catch 92.

Figure 2:
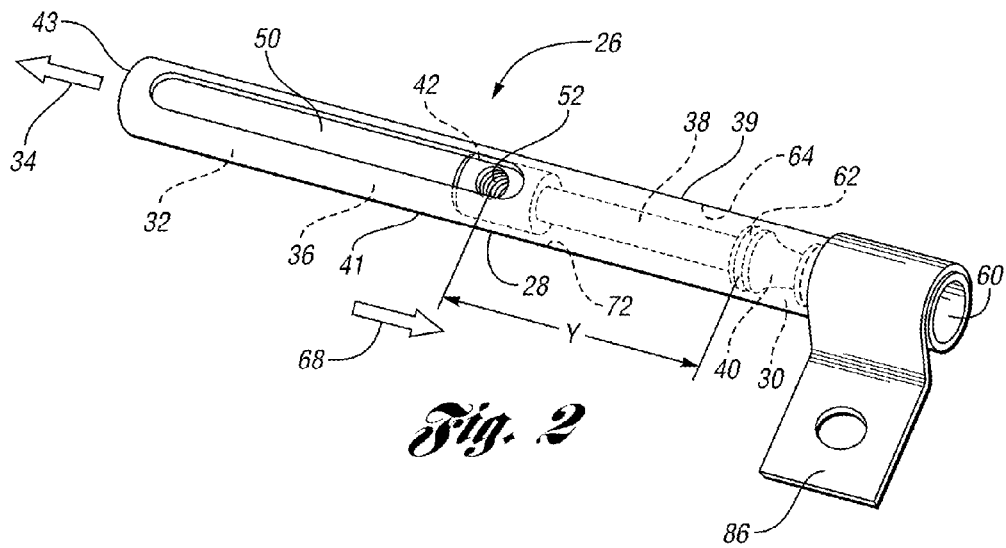
FIG. 2 is a prospective view of a seatbelt pretensioner in accordance with another embodiment of the present invention.

A seatbelt pretensioner 26 may be attached to the seat frame 16. As illustrated in FIGS. 3 and 4, the pretensioner 26 may include a mounting bolt 84 that attaches the pretensioner 26 to the seat frame 16 or other vehicle structure. In one example, the mounting bolt is positioned at a proximal section 39 of the pretensioner 26. The mounting bolt 84 may have threads which engage threads on a receiving nut (not shown). The receiving nut may be a separate component from the frame 16 or integrally formed or welded to the frame 16. Alternatively and as illustrated in FIG. 2, the pretensioner 26 may be attached to the seat frame 16 by a clamp 86, which may be further fastened to the frame 16 by a threaded fastener. In one example, the clamp 86 is positioned at the proximal section 39 of the pretensioner 26. Other suitable means for attaching the pretensioner 26 to the seat frame 16 may also be used.

In a preferred embodiment, the seatbelt pretensioner 26 includes a cylinder 28 or tube having proximal and guide sections 39 and 41 that respectively form a gas chamber 30 and a guide chamber 32 therein. The guide chamber 32 extends from the gas chamber 30 in a distal direction 34. The combustion and guide chambers 30 and 32 together form an interior space 36 within the cylinder 28. The cylinder 28 may be made of metal or any other suitable rigid material. It should be noted that the guide section 41 function primarily as a guide for a piston 38, which will be discussed in further detail below. Accordingly, one skilled in the art will recognize that the guide section 41 need not be integrally formed with the cylinder 28. For example, the guide section 41 may be a separate part or parts that are connected, affixed or attached to the cylinder 28 so as to extend distally from the proximal section 39. In this example, the guide section 41 may be substantially open and include guiding tracks (not shown) or other guiding means without forming a guide chamber 32 for guiding the piston 38.

The piston 38 is disposed within the interior space 36. The piston 38 is moveable in a distal direction 34 or toward the distal end 43 of the guide section 41. The piston 38 has a proximal portion 40 and a distal portion 42 that extends from the proximal portion 40. The proximal and distal portions 40 and 42 are disposed respectively within the combustion and guide chambers 30 and 32, adjacent to the corresponding sections 39 and 41. The anchor 24 is attached to the distal portion 42.

The seatbelt pretensioner 26 further includes a gas generator 44, e.g. pyrotechnic charge, in fluid communication with the gas chamber 30. The gas generator 44 is configured for generating gas to pressurize the gas chamber 30, thereby moving the piston 38 outwardly in the distal direction 34. The moving piston 38 correspondingly moves the anchor 24 and the webbing 20, tensioning the seatbelt 18. In one example, the gas generator 44 is positioned at or adjacent to a proximal end 60 of the gas chamber 30, opposite the distal portion 42 of the piston 38, preferably completely closing off and sealing the end 60.

In at least one embodiment, the anchor 24 is disposed outside the cylinder 28. The cylinder 28 defines at least one aperture 50 which extends through to the guide chamber 32. The aperture 50 provides access and space for attaching the distal portion 42 to the anchor 24. The aperture 50 also allows movement of the piston 38 to tension the seatbelt 18 by providing enough space to accommodate the corresponding movement of the attachment of the distal portion 42 to the anchor 24. In one example, the aperture 50 is a slot, which extends in the distal direction 34, formed in the cylinder 28 wall immediately adjacent to the guide chamber 32. During movement of the piston 38, the attachment of the distal portion 42 to the anchor 24 advances along the slot.

In another example and as illustrated in FIGS. 2 and 5a, the distal portion 42 has a threaded hole 52. The threaded hole 52 is aligned with the aperture 50. The anchor 24 has a threaded member 54. The threaded hole 52 receives the threaded member 54, attaching the distal portion 42 to the anchor 24.

In yet another example, the distal portion 42 has a threaded stud (not shown) formed thereon or inserted therein. The threaded stud is aligned with the aperture 50. The anchor 24 has an opening (not shown) that receives the threaded stud to attach the distal portion 42 to the anchor 24.

In at least one embodiment, the gas chamber 30 is operably sealed. The operably sealed gas chamber 30 preferably substantially prevents or obstructs gas leakage, increasing pressurization of a gas chamber 30 with the discharging gas from the gas generator 44. In one example, the proximal portion 40 of the piston 38 has a seal 62 that is disposed thereabout. The seal 62 sealably interfaces with an inner surface 64 of the gas chamber 30 and the proximal portion 40. The gas chamber 30 extends distally within the interior space 36 of the cylinder 28 to at least a location defined by a position of the seal 62 when the piston 38 has fully moved or stroked to tension the seatbelt 18.

In one embodiment, the piston 38 is actuated to stroke a distance "X" when pretensioning the seatbelt 18. The distal portion 42 that attaches to the anchor 24 (e.g. the threaded hole 52) is spaced apart from the seal 62 by a distance "Y." Preferably, the distance "X" does not exceed the distance "Y" so as to operatively seal the gas chamber 30 to inhibit leakage of the gas generated from the gas generator 44.

Referring to FIGS. 1-6b, the pretensioner 26 may further include a one-way clutch 66. The one-way clutch 66 is disposed in the interior space 36. The one-way clutch 66 is configured to permit movement of the piston 38 in the distal direction 42 while preventing movement of the piston 38 in an opposed direction 68. In one example, the one-way clutch 66 includes a plurality of bearings 70 disposed between the proximal portion 40 of the piston 38 and an inner surface 72 of the cylinder 28. A perimeter surface 100 of the proximal portion 40 may be positioned at an angle or angles (e.g. as with curved surfaces) to the distal direction 34 such that movement of the piston 38 in the distal direction 34 forces the bearings 70 within a deeper recess 48 of the proximal portion 40 where the bearings 70 are free to rotate. However, movement of the piston 38 in the opposed direction 68 positions the bearings within a shallower recess 49 of the proximal portion 40 such that the bearings 70 become lodged between the perimeter and inner surfaces 100 and 72, precluding both rotation of the bearings 70 and movement of the piston 38.

The system 10 may further include decorative trim 46 disposed about the seat 14. The decorative trim 46 may cover the seatbelt pretensioner 26. The decorative trim 46 may have an opening (not shown) formed therethrough. In one example, the webbing 20 is disposed through the opening and guided by the opening during tensioning of the seatbelt 18. The opening may position and guide the webbing 20 relative to the pretensioner 26 such that movement of the piston 38 in the distal direction 34 tensions the seatbelt 18.

Alternatively or in conjunction with the opening of the decorative trim 46, the pretensioner 26 may further include a turning loop 76. The turning loop 76 is disposed about the webbing 20 and may be connected to the cylinder 28 (e.g. at the proximal section 39). The turning loop 76 may be disposed opposite the guide section 41 such that the webbing 20 is positioned and guided to tension the seatbelt 18 when the piston 38 moves in the distal direction 42. In one example, an end portion 23 (see FIGS. 1, 3, 4 and 5d) of the webbing 20, which is coupled to the anchor 24 and extends to the turning loop 76, is positioned substantially parallel and juxtaposed with the pretensioner 26 (e.g. via the turning loop 76 as illustrated in FIGS. 3 and 4) so that movement of the piston 38 pulls or tensions the end portion 23 toward the distal end 43. Whereas, a restraining portion 77 of the webbing 20 (e.g. webbing 20 which extends from the end portion 23) is pulled toward the turning loop 76 during pretensioning.

In at least one other embodiment, the seat 14 mounts to seat tracks 78 that are disposed adjacent to the floor 80 of the vehicle 12. The seat tracks 78 are preferably parallel to each other. The seatbelt pretensioner 26 may be positioned on the seat frame 16 substantially parallel to the seat tracks 78. In one example, the distal direction 34 is generally aligned with the forward direction 82 of the vehicle 12.

As a person skilled in the art will readily appreciate, the above description is meant as an illustration of the implementation of the principles of this invention. This description is not intended to limit the scope or application of this invention in that the invention is susceptible to modification, variation, and change without departing from the spirit of this invention, as defined in the following claims.

The invention claimed is:

1. A seatbelt pretensioner for tensioning a seatbelt of a vehicle, the pretensioner comprising:
   a cylinder having a proximal section which defines a gas chamber that forms at least a portion of an interior space defined by the cylinder, and
   a guide section extending distally from the proximal section;
   a piston disposed within the interior space of the cylinder and moveable toward a distal end of the guide section, the piston having a proximal portion and a distal portion extending therefrom, the proximal and distal portions disposed respectively adjacent to the proximal and guide sections, the distal portion configured for attaching to an anchor that is coupled to webbing of the seatbelt;
   a gas generator in fluid communication with the gas chamber and configured for generating gas to move the piston, tensioning the seatbelt; and
   a seal sealably interfacing with an inner surface of the proximal section of the cylinder and engaged with the proximal portion of the piston so as to move with the piston to obstruct the gas from leaking from the gas chamber during tensioning of the seatbelt.

2. The pretensioner according to claim 1 wherein the anchor is disposed outside the cylinder and the guide section defines an aperture that provides space for attachment of the distal portion of the piston to the anchor.

3. The pretensioner according to claim 2 wherein the aperture is a slot permitting movement of the attachment of the distal portion of the piston to the anchor during tensioning of the seatbelt.

4. The pretensioner according to claim 2 wherein the distal portion of the piston has a threaded hole formed therein that is aligned with the aperture and the anchor has a threaded member, the threaded hole is for receiving the threaded member to attach the distal portion to the anchor.

5. The pretensioner according to claim 1 wherein the gas chamber is operably sealed to prevent the gas leaking from the gas chamber.

6. The pretensioner according to claim 1 wherein the piston is actuated to stroke a distance X when tensioning the seatbelt, and attachment of the anchor to the distal portion is spaced apart from the seal a distance Y when the piston is in an initial position in the cylinder before stroking to tension the seatbelt, the distance X not exceeding the distance Y.

7. The pretensioner according to claim 1 wherein the gas generator is disposed adjacent to a proximal end of the gas chamber.

8. The pretensioner according to claim 1 further comprising a one-way clutch disposed within the inner space and configured to permit movement of the piston toward the distal end of the guide section while preventing movement of the piston in an opposed direction.

9. The pretensioner according to claim 8 wherein the one-way clutch includes bearings disposed between the proximal portion of the piston and an inner surface of the cylinder, and wherein the bearings, the proximal portion of the piston and the inner surface of the cylinder cooperate to permit and prevent movement of the piston respectively toward the distal end of the guide section and the opposed direction.

10. The pretensioner according to claim 1 further comprising a turning loop disposed adjacent to proximal section of the cylinder for receiving the webbing, wherein the webbing that is disposed between the anchor and the turning loop defines an end portion of the webbing, and the webbing that extends from the end portion defines a restraining portion of the webbing, the turning loop positioning the end portion to be pulled toward the distal end and the restraining portion to be pulled toward the turning loop during tensioning of the seat belt.

11. The pretensioner according to claim 1 further comprising a mounting feature disposed adjacent to the proximal section of the cylinder for attaching the pretensioner to a seat of the vehicle.

12. A seatbelt pretensioner system for a vehicle, the system comprising:
   a seatbelt including webbing and configured for restraining an occupant of the vehicle to a seat;
   an anchor coupled to the webbing; and
   a seatbelt pretensioner including:
      a cylinder having a proximal section which defines a gas chamber that forms at least a portion of an interior space defined by the cylinder, and a guide section extending distally from the proximal section;
      a piston disposed within the interior space of the cylinder and moveable toward a distal end of the guide section, the piston having a proximal portion and a distal portion extending therefrom, the proximal and distal portions disposed respectively adjacent to the proximal and guide sections, the distal portion attached to the anchor;
      a gas generator in fluid communication with the gas chamber and configured for generating gas to move the piston, tensioning the seatbelt; and
      a seal sealably interfacing with an inner surface of the proximal section of the cylinder and engaged with the proximal portion of the piston so as to move with the piston to obstruct the gas from leaking from the gas chamber during tensioning of the seatbelt.

13. The system according to claim 12 wherein the anchor is disposed outside the cylinder and the guide section defines an aperture that provides space for attachment of the distal portion to the anchor.

14. The system according to claim 12 wherein the anchor has a catch and the webbing has a closed loop formed at one end, the closed loop of the webbing receiving the catch to couple the webbing to the anchor, and wherein the catch is one of retainer fastened to a portion of the anchor by a retaining bolt, an open hook configuration and a closed hook configuration.

15. The system according to claim 12 wherein the seatbelt pretensioner further includes a mounting feature disposed adjacent to the proximal section of the cylinder, the mounting feature for attaching the seatbelt pretensioner to the seat.

16. The system according to claim 12 wherein the gas chamber is operably sealed to prevent the gas leaking from the gas chamber.

17. The pretensioner according to claim 12 further comprising a turning loop disposed adjacent to proximal section of the cylinder for receiving the webbing, wherein the webbing that is disposed between the anchor and the turning loop defines an end portion of the webbing, and the webbing that extends from the end portion defines a restraining portion of the webbing, the turning loop positioning the end portion to be pulled toward the distal end and the restraining portion to be pulled toward the turning loop during tensioning of the seat belt.

* * * * *